United States Patent Office 3,071,578
Patented Jan. 1, 1963

3,071,578
ANDROSTANE-16,17-DICARBOXYLIC ACID IMIDES
Pierre Crabbé, Mexico City, Mexico, assignor, by mesne assignments, to Syntex Corporation, a corporation of Panama
No Drawing. Filed July 19, 1961, Ser. No. 125,106
19 Claims. (Cl. 260—239.5)

The present invention relates to novel cyclopentanophenanthrene compounds and to a process for the production thereof.

More particularly the present invention relates to novel androstane-16β,17β-dicarboxylic acid imide derivatives and to novel intermediates for the production thereof.

The novel compounds of the present invention which are anti-epileptic and central nervous system depressant agents and which also exhibit anti-ovulatory activity, are represented by the following formulas:

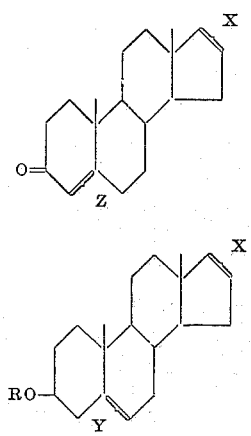

In the above formulas Z represents a double bond for a saturated linkage between C-4 and C-5; Y represents a double bond or a saturated linkage between C-5 and C-6; X represent the group

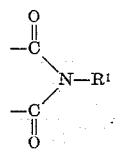

in the 16β,17β-positions, wherein $R^1$ may be hydrogen, a lower alkyl, di(lower alkyl) amino, lower alkyl, aryl or aralkyl group, each containing up to 8 carbon atoms; R represents hydrogen or a hydrocarbon carboxylic acyl group of less than 12 carbon atoms.

The acyl group is derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

The novel compounds of the present invention are prepared by the process illustrated by the following equation:

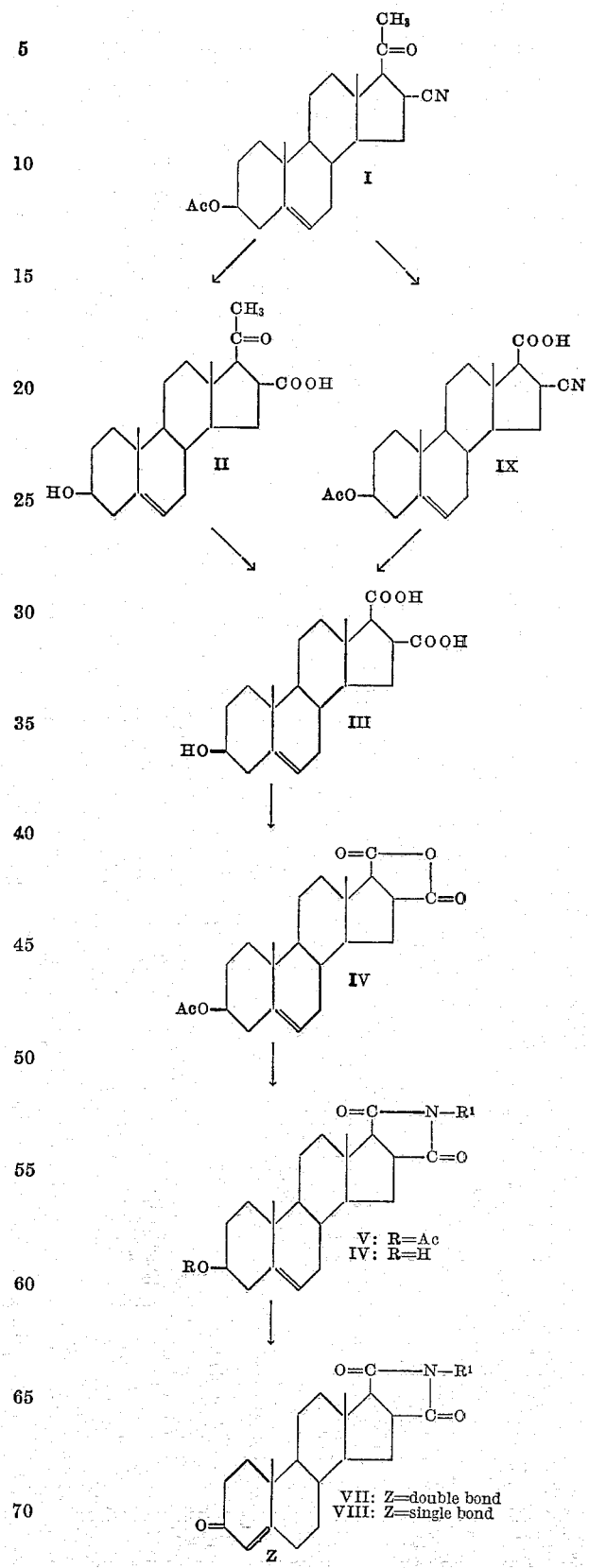

In the above formulas R¹ has the same meaning as hereinabove set forth; Ac represents an acyl group, preferably the acetyl group.

In practicing the process outlined above the starting compound (I) 16α-cyano-Δ⁵-pregnen-3β-ol-20-one 3-acetate [J. Romo, Tetrahedron 3, 37 (1958)], is hydrolyzed in a basic medium, such as methanolic potassium hydroxide, affording Δ⁵-17α-pregnen-3β-ol-20-one-16β-carboxylic acid (II). This compound is treated with an alkali metal hypohalogenite such as sodium hypobromite at a lower temperature, approximately 0° C., for a period of time of the order of 2 hours, thus giving Δ⁵-androsten-3β-ol-16β,17β-dicarboxylic acid (III). Upon reflux of this compound with acetic anhydride there is obtained the anhydride of Δ⁵-androsten-3β-ol-16β,17β-dicarboxylic acid 3-acetate (IV).

Alternatively the starting compound (I) is treated with an alkali metal hypohalogenite, such as sodium hypobromite, at a low temperature, approximately 0° C., for a period of time of the order of 2 hours, thus furnishing 16α-cyano-Δ⁵-androsten-3β-ol-17β-carboxylic acid 3-acetate (IX). Hydrolysis of this compound in a basic medium such as methanolic potassium hydroxide, affords the above obtained Δ⁵-androsten-3β-ol-16β,17β-dicarboxylic acid (III).

The anhydride of Δ⁵-androsten-3β-ol-16β,17β-dicarboxylic acid 3-acetate compound (IV) is treated with a primary amine, as for example, methylamine, ethylamine, propylamine, aniline, benzylamine or ammonia, thus giving the corresponding Δ5-androsten-3β-ol-16β,17β-dicarboxylic acid imide 3-acetate derivative (V) which upon saponification in a mild alkaline medium, such as potassium carbonate solution, affords the corresponding free 3β-alcohol (VI). This free alcohol is oxidized under Oppenauer conditions to the corresponding Δ⁴-androsten-3-one-16β,17β-dicarboxylic acid amide derivative (VII) which is hydrogenated to the respective saturated 3-ketone androstane (VIII).

The Δ⁵-3β-alcohol derivative (VI) is hydrogenated to the corresponding androstan-3β-ol-16β,17β-dicarboxylic acid amide derivative.

The above obtained compounds containing a free secondary hydroxyl group at C-3 are conventionally acylated in pyridine with a hydrocarbon carboxylic acid anhydride or chloride containing up to 12 carbon atoms of the type mentioned previously to furnish the corresponding 3β-acyloxy derivative.

The following specific examples serve to illustrate but are not intended to limit the scope of the present invention:

*Example I*

5 g. of 16α-cyano-Δ⁵-pregnen-3β-ol-20-one 3-acetate [J. Romo, Tetrahedron 3, 37 (1958)], were dissolved in 200 cc. of dioxane. A solution, prepared by dissolving 7 g. of sodium hydroxide in 60 cc. of water and 40 cc. of dioxane and further adding dropwise 3.2 cc. of bromine, was added to the steroid solution, the operation being conducted at —5° C. The resulting mixture was stirred for 2 hours, maintaining the temperature under 5° C. It was then treated with 50 cc. of a saturated solution of sodium sulfite in water, refluxed for 15 minutes, acidified with concentrated hydrochloric acid, saturated with sodium chloride and extracted with ethyl acetate. The extract was washed with water, dried over anhydrous sodium sulfate and evaporated to dryness thus affording 16α-cyano-Δ⁵-androsten-3β-ol-17β-carboxylic acid 3-acetate. M.P. 259–261° C.; [α]_D —62° (pyridine). By alkaline hydrolysis the 3β-alcohol was obtained: M.P. 271–274°; [α]_D —71° (pyridine).

The foregoing compound was refluxed for 10 hours with 250 cc. of 4% methanolic potassium hydroxide solution and then neutralized with acetic acid. Part of the solvent was removed under reduced pressure and the concentrated solution poured into water. The formed precipitate was filtered off, washed with water and dried in vacuo. Recrystallization from acetone-hexane afforded Δ⁵-androsten-3β-ol-16β,17β-dicarboxylic acid. M.P. 312–314° C.; [α]_D —63° (pyridine).

*Example II*

By reversing the steps described in the preceding Example, 5 g. of 16α-cyano-Δ⁵-pregnen-3β-ol-20-one 3-acetate was first hydrolyzed with 4% methanolic potassium hydroxide as described in Example I to afford Δ⁵-17α-pregnen-3β-ol-20-one-16β-carboxylic acid, identical with an authentic specimen.

Upon further treatment with sodium hydroxide and bromine as described in Example I and working up the product as set forth in that example, there was afforded Δ⁵-androsten-3β-ol-16β,17β-dicarboxylic acid. M.P. 307–309° C., identical with the above obtained diacid.

*Example III*

The foregoing compound, Δ⁵-androsten-3β-ol-16β,17β-dicarboxylic acid was refluxed for 10 minutes with 60 cc. of acetic anhydride. The acetic anhydride was then evaporated under vacuum and the residue recrystallized from methylene-chloride-hexane affording the anhydride of the Δ⁵-androsten-3β-ol-16β,17β-dicarboxylic acid 3-acetate. M.P. 171–175° C.; [α]_D —83° (CHCl₃).

*Example IV*

2 g. of this last anhydride was treated with a solution of 2 g. of propylamine in methylene chloride. The reaction mixture was allowed to stand at room temperature overnight. The solvent was then evaporated and the residue recrystallized from acetone-hexane affording N-propyl-Δ⁵-androsten-3β-ol-16β,17β-dicarboxylic acid imide 3-acetate.

*Example V*

2 g. of the anhydride of Δ⁵-androsten-3β-ol-16β,17β-dicarboxylic acid 3-acetate was treated following the technique described in Example IV except that propylamine was substituted by N,N-diethylamino-ethylamine, giving N - (N',N' - diethylaminoethyl)-Δ⁵-androsten-3β-ol-16β,17β-dicarboxylic acid imide 3-acetate.

*Example VI*

2 g. of the anhydride of Δ⁵-androsten-3β-ol-16β,17β-dicarboxylic acid 3-acetate was treated following the technique described in Example IV except that propylamine was substituted by aniline affording N-phenyl-Δ⁵-androsten-3β-ol-16β,17β-dicarboxylic acid imide 3-acetate.

*Example VII*

2 g. of the anhydride of Δ⁵-androsten-3β-ol-16β,17β-dicarboxylic acid 3-acetate were treated with 50 cc. of a saturated solution of ammonia in anhydrous ethanol. The reaction mixture was kept in a closed vessel at room temperature for 24 hours. It was then evaporated to dryness and the residue recrystallized from acetone thus affording Δ⁵ - androsten-3β-ol-16β,17β-dicarboxylic acid imide 3-acetate.

*Example VIII*

1.5 g. of Δ⁵-androsten-3β-ol-16β,17β-dicarboxylic acid imide 3-acetate in 50 cc. of methanol were treated with 0.5 g. of potassium carbonate in 2.5 cc. of water. The mixture was refluxed for 30 minutes, then poured into ice water and the precipitate collected, washed with water and dried, thus producing a crude product which upon recrystallization from acetone-hexane afforded Δ⁵-androsten-3β-ol-16β,17β-dicarboxylic acid imide.

When applying this selective saponification to N-propyl-Δ⁵-androsten-3β-ol-16β,17β-dicarboxylic acid imide-3-acetate, N-(N',N'-diethylaminoethyl)-Δ⁵-androsten-3β-ol-16β,17β-dicarboxylic acid imide 3-acetate, N-phenyl- Δ⁵-androsten-3β-ol-16β,17β-dicarboxylic acid imide 3-acetate, there were respectively obtained Δ⁵-androsten-3β-ol-16β,17β-dicarboxylic acid imide, N-propyl-Δ⁵-androsten-3β-ol-16β,17β-dicarboxylic acid imide, N-(N',N'-diethylaminoethyl)-Δ⁵-androsten-3β-ol-16β,17β-dicarboxylic acid imide and N-phenyl-Δ⁵-androsten-3β-ol-16β,17β-dicarboxylic acid imide.

*Example IX*

A solution of 1 g. of Δ⁵-androsten-3β-ol-16β,17β-dicarboxylic acid imide in 80 cc. of toluene and 20 cc. of cyclohexanone was dried by distilling off 10 cc. of the solvent. A solution of 1 g. of aluminum isopropoxide in 7 cc. of anhydrous toluene was then added and the mixture was refluxed for 45 minutes.

4 cc. of acetic acid were added and the solvents removed by steam distillation. The product was extracted several times with ethyl acetate and the organic extracts washed with 1% hydrochloric acid solution, water, 10% sodium carbonate solution and water until neutral, dried over anhydrous sodium sulfate and evaporated to dryness. Crystallization from methanol afforded Δ⁴-androsten-3-one-16β,17β-dicarboxylic acid imide.

Upon oxidation by the same technique of N-propyl-Δ⁵-androsten-3β-ol-16β,17β-dicarboxylic acid imide, N-(N',N'-diethylaminoethyl)-Δ⁵-androsten-3β-ol-16β,17β-dicarboxylic acid imide, N-phenyl-Δ⁵-androsten-3β-ol-16β,17β-dicarboxylic acid imide, there were correspondingly formed Δ⁴-androsten-3-one-16β,17β-dicarboxylic acid imide, N-propyl-Δ⁴-androsten-3-one-16β,17β-dicarboxylic acid imide, N-(N',N'-diethylaminoethyl)-Δ⁴-androsten-3-one-16β,17β-dicarboxylic acid imide and N-phenyl-Δ⁴-androsten-3-one-16β,17β-dicarboxylic acid imide.

*Example X*

A solution of 800 mg. of Δ⁴-androsten-3-one-16β,17β-dicarboxylic acid imide in 40 cc. of ethyl acetate was shaken with 50 mg. of 5% palladium-charcoal catalyst in a hydrogen atmosphere, until 1 mol. of gas was consumed. The catalyst was filtered off and the filtrate evaporated to dryness. Recrystallization from methanol-benzene afforded androstan-3-one-16β,17β-dicarboxylic acid imide. Following the same technique were hydrogenated N-propyl-Δ⁴-androsten-3-one-16β,17β-dicarboxylic acid imide, N-(N',N'-diethylaminoethyl)-Δ⁴-androsten-3-one-16β,17β-dicarboxylic acid imide, N-phenyl-Δ⁴-androsten-3-one-16β,17β-dicarboxylic acid imide giving respectively androstan-3-one-16β,17β-dicarboxylic acid imide, N-propyl-androstan-3-one-16β,17β-dicarboxylic acid imide, N-(N',N'-diethylaminoethyl)-androstan-3-one-16β,17β-dicarboxylic acid imide and N-phenyl-androstan-3-one-16β,17β-dicarboxylic acid imide.

*Example XI*

800 mg. of Δ⁵-androsten-3β-ol-16β,17β-dicarboxylic acid imide were hydrogenated following the technique described in Example X, giving androstan-3β-ol-16β,17β-dicarboxylic acid imide.

When applying this procedure to N-propyl-Δ⁵-androsten-3β-ol-16β,17β-dicarboxylic acid imide, N-(N',N'-diethylaminoethyl)-Δ⁵-androsten-3β-ol-16β,17β-dicarboxylic acid imide, N-phenyl-Δ⁵-androsten-3β-ol-16β,17β-dicarboxylic acid imide, there were correspondingly formed androstan-3β-ol-16β,17β-dicarboxylic acid imide, N-propyl-androstan-3β-ol-16β,17β-dicarboxylic acid imide, N-(N',N'-diethylaminoethyl)-androstan-3β-ol-16β,17β-dicarboxylic acid imide and N-phenyl-androstan-3β-ol-16β,17β-dicarboxylic acid imide.

*Example XII*

500 mg. of Δ⁵-androsten-3β-ol-16β,17β-dicarboxylic acid imide in 5 cc. of pyridine were treated with 1 cc. of propionic anhydride. The reaction mixture was left overnight at room temperature, then poured into ice water, the formed precipitate filtered off, washed with water and dried. Recrystallization from acetone-hexane afforded Δ⁵-androsten-3β-ol-16β,17β-dicarboxylic acid imide 3-propionate.

Following the above technique were treated the starting materials listed below, with the acylating agent indicated, furnishing the corresponding products hereinafter set forth.

| Starting compound | Acylating agent | Product |
| --- | --- | --- |
| Δ⁵-androsten-3β-ol-16β,17β-dicarboxylic acid imide. | caproic anhydride | 3-caproate of Δ⁵-androsten-3β-ol-16β,17β-dicarboxylic acid imide. |
| Do | cyclopentylpropionic anhydride. | 3-cyclopentylpropionate of Δ⁵-androsten-3β-ol-16β,17β-dicarboxylic acid imide. |
| N-propyl-Δ⁵-androsten-3β-ol-16β,17β-dicarboxylic acid imide. | benzoyl chloride | 3-benzoate of N-propyl-Δ⁵-androsten-3β-ol-16β,17β-dicarboxylic acid imide. |
| Do | propionic anhydride. | 3-propionate of N-propyl-Δ⁵-androsten-3β-ol-16β,17β-dicarboxylic acid imide. |
| N-(N',N'-diethylaminoethyl)-Δ⁵-androsten-3β-ol-16β,17β-dicarboxylic acid imide. | caproic anhydride | 3-caproate of N-(N',N'-diethylaminoethyl)-Δ⁵-androsten-3β-ol-16β,17β-dicarboxylic acid imide. |
| N-(N',N'-diethylaminoethyl)-Δ⁵-androsten-3β-ol-16β,17β-dicarboxylic acid. | cyclopentylpropionic anhydride. | 3-cyclopentylpropionate of N-(N',N'-diethylaminoethyl)-Δ⁵-androsten-3β-ol-16β,17β-dicarboxylic acid imide. |
| androstan-3β-ol-16β,17β-dicarboxylic acid imide. | propionic anhydride. | 3-propionate of androstan-3β-ol-16β,17β-dicarboxylic acid imide. |
| Do | cyclopentylpropionic anhydride. | 3-cyclopentylpropionate of androstan-3β-ol-16β,17β-dicarboxylic acid imide. |
| N-(N',N'-diethylaminoethyl)-androstan-3β-ol-16β,17β-dicarboxylic acid imide. | caproic anhydride | 3-caproate of N-(N',N'-diethylaminoethyl)-androstan-3β-ol-16β,17β-dicarboxylic acid imide. |
| Do | benzoyl chloride | 3-benzoate of N-(N',N'-diethylaminoethyl)-androstan-3β-ol-16β,17β-dicarboxylic acid imide. |
| N-phenyl-androstan-3β-ol-16β,17β-dicarboxylic acid imide. | propionic anhydride. | 3-propionate of N-phenyl-androstan-3β-ol-16β,17β-dicarboxylic acid imide. |
| Do | benzoyl chloride | 3-benzoate of N-phenyl-androstan-3β-ol-16β,17β-dicarboxylic acid imide. |

*Example XIII*

By substituting in the method of Example IV the propylamine by other alkylamines such as methylamine, ethylamine or heptylamine, there was obtained the corresponding N-methyl, N-ethyl, and N-heptyl derivatives of Δ⁵-androsten-3β-ol-16β,17β-dicarboxylic acid imide 3-acetate which upon selective saponification by the method described in Example VIII were transformed into the corresponding free 3β-alcohols.

By following the technique described in Example IX the thus formed 3β-alcohols were oxidized to the corresponding 3-ketones, namely the N-methyl, N-ethyl and N-heptyl derivatives of Δ⁴-androstene-3-one-16β,17β-dicarboxylic acid imide.

*Example XIV*

By substituting in Example VI the aniline by benzylamine or phenethylamine, there were obtained the corresponding N-benzyl and N-phenethyl derivatives.

I claim:
1. A compound selected from the group consisting of the following formula:

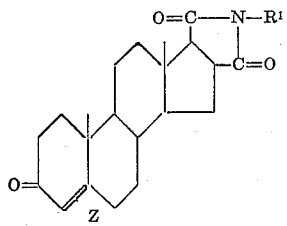

wherein Z is selected from the group consisting of a double bond between C–4 and C–5 and a saturated linkage between C–4 and C–5 and $R^1$ is selected from the group consisting of hydrogen, alkyl, dialkylaminoalkyl, aryl and aralkyl radicals each containing up to 8 carbon atoms.

2. $\Delta^4$-androsten-3-one-16$\beta$,17$\beta$-dicarboxylic acid imide.

3. N-(N',N'-diethylaminoethyl)-$\Delta^4$-androsten - 3 - one-16$\beta$,17$\beta$-dicarboxylic acid imide.

4. N-phenyl-$\Delta^4$-androsten-3-one-16$\beta$,17$\beta$ - dicarboxylic acid imide.

5. Androstan-3-one-16$\beta$,17$\beta$-dicarboxylic acid imide.

6. N-propyl-androstan-3-one-16$\beta$,17$\beta$-dicarboxylic acid imide.

7. A compound selected from the group consisting of the following formula:

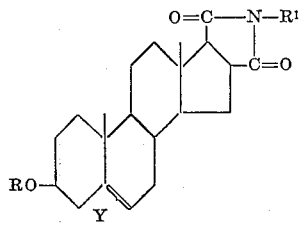

wherein Y is selected from the group consisting of a double bond between C–5 and C–6 and a single bond between C–5 and C–6; R is selected from the group consisting of hydrogen and a hydrocarbon carboxylic acyl group of less than 12 carbon atoms and $R^1$ is selected from the group consisting of hydrogen, alkyl, dialkylaminoalkyl, aryl and aralkyl radicals each containing up to 8 carbon atoms.

8. Androstan-3$\beta$-ol-16$\beta$,17$\beta$-dicarboxylic acid imide.

9. N-propyl-androstan-3$\beta$-ol-16$\beta$,17$\beta$-dicarboxylic acid imide.

10. N-(N',N'-diethylaminoethyl)-$\Delta^5$-androsten - 3$\beta$-ol-16$\beta$,17$\beta$-dicarboxylic acid imide.

11. The 3-acetate of $\Delta^5$-androsten-3$\beta$-ol-16$\beta$,17$\beta$-dicarboxylic acid imide.

12. The 3-propionate of N-propyl-$\Delta^5$-androsten-3$\beta$-ol-16$\beta$,17$\beta$-dicarboxylic acid imide.

13. The 3-caproate of N-(N',N'-diethylaminoethyl)-$\Delta^5$-androsten-3$\beta$-ol-16$\beta$,17$\beta$-dicarboxylic acid imide.

14. The 3-propionate of N-phenyl-androstan-3$\beta$-ol-16$\beta$,17$\beta$-dicarboxylic acid imide.

15. The 3-benzoate of N-phenyl-androstan-3$\beta$-ol-16$\beta$,17$\beta$-dicarboxylic acid imide.

16. $\Delta^5$-androsten-3$\beta$-ol-16$\beta$,17$\beta$-dicarboxylic acid.

17. The acetate of $\Delta^5$-androsten-3$\beta$-ol-16$\beta$,17$\beta$-dicarboxylic acid anhydride.

18. A process for the production of androstan-16$\beta$,17$\beta$-dicarboxylic acid imide derivatives which comprises treating the corresponding 16$\alpha$-cyano-pregnan-20-one compound with an alkali metal hypohalogenite, hydrolyzing the 16$\alpha$-cyano-androstan-16$\beta$-carboxylic acid thus formed in a basic medium, refluxing the obtained dicarboxylic acid with an acid anhydride and treating the formed steroid anhydride with a primary amine selected from the group consisting of alkylamine, dialkylaminoalkylamine, arylamine and aralkyamine each containing up to 8 carbon atoms and ammonia.

19. The process of claim 18 wherein the alkali metal hypohalogenite is sodium hypobromite, the basic medium is dilute methanolic potassium hydroxide, the anhydride is acetic anhydride and the amine is propylamine.

No reference cited.